US007434108B2

(12) United States Patent
Moyer et al.

(10) Patent No.: US 7,434,108 B2
(45) Date of Patent: Oct. 7, 2008

(54) MASKING WITHIN A DATA PROCESSING SYSTEM HAVING APPLICABILITY FOR A DEVELOPMENT INTERFACE

(75) Inventors: William C. Moyer, Dripping Springs, TX (US); Richard G. Collins, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 560 days.

(21) Appl. No.: 10/836,173

(22) Filed: Apr. 30, 2004

(65) Prior Publication Data

US 2005/0257102 A1    Nov. 17, 2005

(51) Int. Cl.
*G06F 11/00* (2006.01)
(52) U.S. Cl. .......................... 714/45; 714/30; 717/124; 717/128; 712/227
(58) Field of Classification Search .................. 714/30, 714/45; 717/124, 128; 712/227
See application file for complete search history.

(56) References Cited

U.S. PATENT DOCUMENTS

| | | | | |
|---|---|---|---|---|
| 4,598,364 | A | * | 7/1986 | Gum et al. ..................... 714/38 |
| 5,513,317 | A | * | 4/1996 | Borchardt et al. ............. 714/45 |
| 5,826,058 | A | | 10/1998 | Hartvlgsen et al. |
| 6,145,122 | A | | 11/2000 | Miller |
| 6,467,083 | B1 | * | 10/2002 | Yamashita ................... 717/128 |
| 6,611,924 | B1 | * | 8/2003 | Warmink et al. ............... 714/38 |
| 6,728,949 | B1 | * | 4/2004 | Bryant et al. ................ 717/127 |
| 6,732,311 | B1 | * | 5/2004 | Fischer et al. ................ 714/737 |
| 6,816,989 | B2 | * | 11/2004 | Litt .............................. 714/724 |
| 6,918,065 | B1 | * | 7/2005 | Edwards et al. ................ 714/45 |
| 7,003,699 | B2 | * | 2/2006 | Swaine et al. ................. 714/30 |
| 7,051,237 | B2 | * | 5/2006 | Mayer ........................... 714/27 |
| 7,149,926 | B2 | * | 12/2006 | Ahmad et al. ................. 714/30 |
| 2003/0126314 | A1 | | 7/2003 | Litt |

FOREIGN PATENT DOCUMENTS

WO    WO 03/034225 A2    4/2003

* cited by examiner

*Primary Examiner*—Robert W Beausoliel, Jr.
*Assistant Examiner*—Philip Guyton
(74) *Attorney, Agent, or Firm*—Susan C. Hill; Joanna G. Chiu

(57) ABSTRACT

In current real-time debug systems, debug messages are transmitted through a limited bandwidth port (18) from an integrated circuit (10) to an external development system (25). As some integrated circuits (10) become even more densely packed with multiple bus masters (11, 12) and/or multiple busses (16) capable of generating messages, it is becoming more and more difficult for the limited bandwidth port (18) to sufficiently support the volume of debug messages that are to be transmitted from an integrated circuit (10) to an external development system (25). A plurality of masks (70, 80, 90, 100, 110, 120, 130, 140, 150) and masking circuitry (36) may be used to selectively mask portions (41-45, 51-55) of debug messages (40, 50) in order to significantly improve bandwidth.

21 Claims, 7 Drawing Sheets

ADDRESS MASK CONTROL REGISTER 110
(RELATIVE)

| INDIVIDUAL ADDRESS BIT MASK FOR DATA TRACE MESSAGES |
|---|

ADDRESS MASK CONTROL REGISTER 120
(FULL)

| INDIVIDUAL ADDRESS BIT MASK FOR DATA TRACE MESSAGES WITH SYNC |
|---|

SOURCE MASK CONTROL REGISTER 130

INDIVIDUAL SOURCE PROCESSOR BIT MASK FOR DATA TRACE MESSAGES

| 0 | |
|---|---|

DATA SIZE MASK CONTROL REGISTER 140

INDIVIDUAL DATA SIZE BIT MASK FOR DATA TRACE MESSAGES

| 0 | |
|---|---|

MESSAGE TYPE
MASK CONTROL REGISTER 150

INDIVIDUAL MESSAGE TYPE BIT MASK FOR ALL MESSAGES

| 0 | |
|---|---|

| MONITORING OF TWO CONTROL VARIABLES IN MEMORY WHILE PERFORMING PROGRAM TRACE MESSAGING: |
|---|
| VARIABLE1 – LOCATED AT ADDRESS 0x1300D3C3, TYPE IS 8-BTS<br>VARIABLE2 – LOCATED AT ADDRESS 0x81001BF4, TYPE IS 16-BTS |
| <u>MESSAGES WITHOUT MASKING</u> |
| abcdefgh\|000100110000000011010011110000011\|000\|0001\|001101 – VARIABLE1 MESSAGE (52 BITS)<br>  (DATA)        (FULL ADDRESS)        (DATA  (SOURCE  (MESSAGE<br>                                      SIZE) PROCESSOR) TYPE)<br>tuvwxyzklmnopqr\|10000001000000000000110111111110100\|010\|0100\|001101 – VARIABLE2 MESSAGE (60 BITS)<br>   (DATA)         (FULL ADDRESS)       (DATA  (SOURCE  (MESSAGE<br>                                           SIZE) PROCESSOR) TYPE) |
| <u>MESSAGES WITH MASKING</u> |
| (DATA, A31, NO DATA SIZE SENT, NO SOURCE PROCESSOR SENT, 1 BIT MESSAGE TYPE):<br>abcdefgh\|1\|1 – VARIABLE1 MESSAGE (10 BITS)<br>tuvwxyzklmnopqr\|0\|1 – VARIABLE2 MESSAGE (18 BITS) |
| <u>MASK CONTROL REGISTER VALUES</u> |
| MESSAGE TYPE MASK = 111110 (6 BITS)<br>SOURCE MASK = 1111 (4 BITS)<br>DATA SIZE MASK = 111 (3 BITS)<br>ADDRESS MASK = 11111111111111111111111111111110 (32 BITS)<br>NO DATA MASKING |

EXAMPLE 200 OF MASKING USAGE

*FIG. 14*

MONITORING OF AN ARRAY OF MIXED SINGLE- AND DOUBLE-PRECISION FLOATING-POINT CONTROL VARIABLES IN MEMORY WHILE PERFORMING PROGRAM TRACE MESSAGING. NEED TO DETERMINE WHEN A CONTROL VARIABLE EXCEEDS 12.5% (1/8) OF THE MAGNITUDE SUPPORTED BY THE DATA TYPE OF THE VARIABLE. ⟵ 301

SINGLE PRECISION FORMAT IS:
SIGN; EXPONENT; MANTISSA
1 BIT; 8 BITS; 23 BITS

DOUBLE PRECISION FORMAT IS:
SIGN; EXPONENT; MANTISSA
1 BIT; 11 BITS; 52 BITS

CAN EXAMINE UPPER 3 BITS OF EXPONENT TO DETERMINE OVER-RANGE CONDITION,
ARRAY1 - LOCATED AT ADDRESS 0x1300D300 - 0x1300D3FF, 256 BYTE ARRAY CONSISTING OF 16 DOUBLE PRECISION VARIABLES
AND 32 SINGLE PRECISION FLOATING POINT VARIABLES, RANDOMLY ACCESSED:

MESSAGES WITH RELATIVE ADDRESS AND WITHOUT MASKING ⟵ 302 dddddddddddddddddddddddddddddddddddddddddddddddddddd|aaaaaaaa|000|0001|000101 - EACH DOUBLE PRECISION MESSAGE (85 BITS)
(DATA)                                          (RELATIVE (DATA (SOURCE (MESSAGE
                                                 ADDRESS) SIZE) PROCESSOR) TYPE)

ssssssssssssssssssssssssss|aaaaaaaa|010|0100|000101 - EACH SINGLE PRECISION ACCESS MESSAGE (53 BITS)
(DATA)                     (RELATIVE (DATA (SOURCE (MESSAGE
                            ADDRESS) SIZE) PROCESSOR) TYPE)

MESSAGES WITH MASKING ⟵ 304

(DATA, RELATIVE ADDRESS, 1 SIZE BIT SIZE SENT, NO SOURCE PROCESSOR SENT, 1 BIT MESSAGE TYPE):
eee|aaaaaaaa|0|1 - DOUBLE PRECISION MESSAGE (13 BITS)
fff|aaaaaaaa|1|1 - SINGLE PRECISION MESSAGE (13 BITS)

MASK CONTROL REGISTER VALUES ⟵ 306

MESSAGE TYPE MASK = 111110 (6 BITS)           SOURCE MASK = 1111 (4 BITS)           DATA SIZE MASK = 110 (3 BITS)
ADDRESS MASK   = 11111111111111111111100000000 (32 BITS)
DATA MASK 64   = 1000111111111111111111111111111111111111111111111111111111111111 (64 BITS)
DATA MASK 32   = 10001111111111111111111111111111 (32 BITS)

⟵ EXAMPLE 300 OF MASKING USAGE

*FIG. 15*

MONITORING OF AN ARRAY OF MIXED SINGLE- AND DOUBLE-PRECISION FLOATING-POINT CONTROL VARIABLES IN MEMORY WHILE PERFORMING PROGRAM TRACE MESSAGING. NEED TO MONITOR APPROXIMATE VALUES OF BOUNDED CONTROL VARIABLES: ⟵ 401

SINGLE PRECISION FORMAT IS:          DOUBLE PRECISION FORMAT IS:
SIGN; EXPONENT; MANTISSA              SIGN; EXPONENT; MANTISSA
1 BIT; 8 BITS; 23 BITS                1 BIT; 11 BITS; 52 BITS

CAN EXAMINE LOWER 5 BITS OF SINGLE PRECISION EXPONENT, MIDDLE 5 BITS OF DOUBLE PRECISION EXPONENT, AND SIGN AND MOST SIGNIFICANT 4 BITS OF MANTISSA TO MONITOR APPROXIMATE VALUES.,
ARRAY1 - LOCATED AT ADDRESS 0x1300D300 - 0x1300D3FF, 256 BYTE ARRAY CONSISTING OF 16 DOUBLE PRECISION VARIABLES AND 32 SINGLE PRECISION FLOATING POINT VARIABLES, RANDOMLY ACCESSED: ⟵ 402

MESSAGES WITH RELATIVE ADDRESS AND WITHOUT MASKING dddddddddddddddddddddddddddddddddddddddddddddddddddddd|aaaaaaaa|000|0001|000101 - EACH DOUBLE PRECISION ACCESS MESSAGE (85 BITS)
(DATA)                                                  (RELATIVE (DATA  (SOURCE (MESSAGE
                                                         ADDRESS) SIZE)  PROCESSOR) TYPE)

sssssssssssssssssssssssss|aaaaaaaa|010|0100|000101 - EACH SINGLE PRECISION ACCESS MESSAGE (53 BITS)
(DATA)                    (RELATIVE (DATA (SOURCE (MESSAGE
                           ADDRESS) SIZE) PROCESSOR) TYPE)

MESSAGES WITH MASKING (DATA, RELATIVE ADDRESS, 1 DATA SIZE BIT SIZE SENT, NO SOURCE PROCESSOR SENT, 1 BIT MESSAGE TYPE): ⟵ 404
seeeeffff|aaaaaaa|0|1 - DOUBLE PRECISION MESSAGE (20 BITS)
seeeeffff|aaaaaaa|1|1 - SINGLE PRECISION MESSAGE (20 BITS)

MASK CONTROL REGISTER VALUES

MESSAGE TYPE MASK = 111110 (6 BITS)      SOURCE MASK = 1111 (4 BITS)     DATA SIZE MASK = 110 (3 BITS) ⟵ 406
ADDRESS MASK = 11111111111111111111111100000000 (32 BITS)
DATA MASK (64 BITS) = 0111000000110000001111111111111111111111111111111111111111111111 (64 BITS)
DATA MASK (32 BITS) = 01110000001100001111111111111111 (32 BITS)

⟵ EXAMPLE 400 OF MASKING USAGE

FIG. 16

MASKING WITHIN A DATA PROCESSING SYSTEM HAVING APPLICABILITY FOR A DEVELOPMENT INTERFACE

RELATED APPLICATION

This is related to U.S. Pat. No. 6,145,122, issued Nov. 7, 2000, and entitled "Development Interface For A Data Processor" which is incorporated herein by reference.

FIELD OF THE INVENTION

The present invention relates generally to a data processing system, and more particularly to masking within a data processing system having applicability for a development interface.

RELATED ART

In current real-time debug systems, debug messages are transmitted through a limited bandwidth port from an integrated circuit to an external development system. As some integrated circuits become even more densely packed with multiple bus masters and/or multiple busses capable of generating messages, it is becoming more and more difficult for the limited bandwidth port to sufficiently support the volume of debug messages that are to be transmitted from an integrated circuit to an external development system.

BRIEF DESCRIPTION OF THE DRAWINGS

The present invention is illustrated by way of example and not limited by the accompanying figures, in which like references indicate similar elements, and in which:

FIG. 9 illustrates, in block diagram form, an address mask control register 110 in accordance with one embodiment of the present invention;

FIG. 10 illustrates, in block diagram form, an address mask control register 120 in accordance with one embodiment of the present invention;

FIG. 11 illustrates, in block diagram form, a source mask control register in accordance with one embodiment of the present invention;

FIG. 12 illustrates, in block diagram form, a data size mask control register in accordance with one embodiment of the present invention;

FIG. 13 illustrates, in block diagram form, a message type mask control register in accordance with one embodiment of the present invention;

FIG. 14 illustrates, in tabular form, an example 200 of how masking may be used to reduce the number of output bits transmitted on terminals 18;

FIG. 15 illustrates, in tabular form, an example 300 of how masking may be used to reduce the number of output bits transmitted on terminals 18; and FIG. 16 illustrates, in tabular form, an example 400 of how masking may be used to reduce the number of output bits transmitted on terminals 18.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

As used herein, the term "bus" is used to refer to a plurality of signals or conductors which may be used to transfer one or more various types of information, such as data, addresses, control, or status. The symbol "%" preceding a number indicates that the number is represented in its binary or base two form. The symbol "0x" preceding a number indicates that the number is represented in its hexadecimal or base sixteen form.

Figure 1:
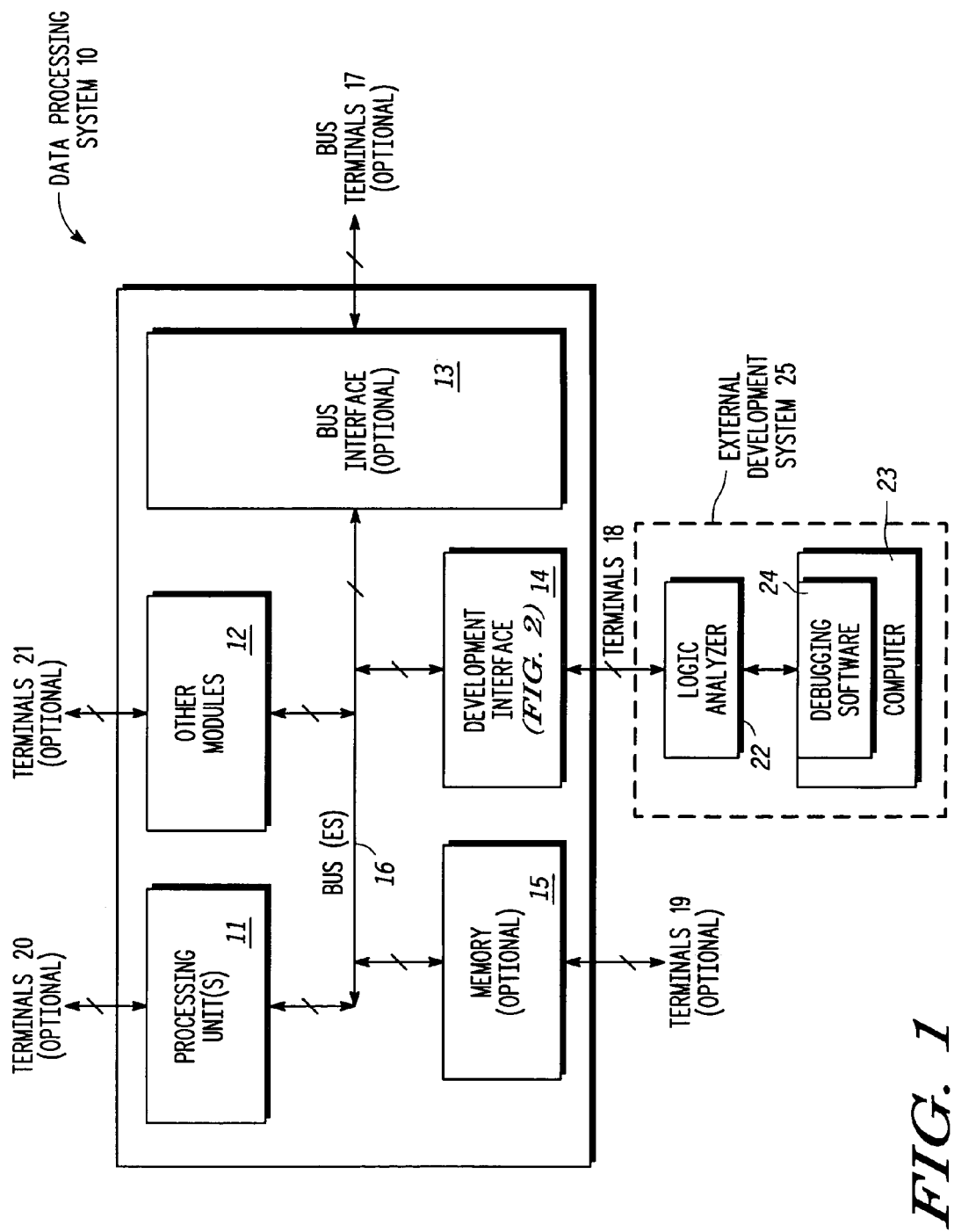
FIG. 1 illustrates, in block diagram form, a data processing system in accordance with one embodiment of the present invention.

FIG. 1 illustrates, in block diagram form, a data processing system in accordance with one embodiment of the present invention. In the illustrated embodiment, data processing system 10 includes one or more processing units 11, includes one or more other modules 12, optionally includes a bus interface 13, includes a development interface 14, and optionally includes one or more memories 15, all of which may be bi-directionally coupled by way of one or more buses 16. In some embodiments, memories 15 may optionally be coupled external to data processing system 10 by way of terminals 19; processing units 11 may optionally be coupled external to data processing system 10 by way of terminals 20; modules 12 may optionally be coupled external to data processing system 10 by way of terminals 21; and bus interface 13 may optionally be coupled external to data processing system 10 by way of terminals 17.

In some embodiments, development interface 14 may be coupled external to data processing system 10 by way of terminals 18. In one embodiment, development interface 14 may be coupled to external development system 25 by way of terminals 18. In one embodiment, external development system 25 includes a logic analyzer 22 coupled to data processing system 10 by way of terminals 18. In some embodiments, logic analyzer 22 may be bi-directionally coupled to a computer 23 which includes circuitry 24 for storing and/or carrying out the functionality of debugging software.

Alternate embodiments of the present invention may use any type of architecture for data processing system 10. The architecture illustrated in FIG. 1 is just one possible architecture. Alternate embodiments of the present invention may use any type of development system for development system 25. Terminals 17-21 may be any type of terminals which allow information to be transferred to or from data processing system 10. Other modules 12 may perform any function. Processing unit(s) 11 may process data in any manner. Memory 15 may be any type of circuitry capable of storing information. Bus interface 13 may be any type of circuitry which allows an interface between one or more bus(es) 16 and an external bus (not shown) coupled to bus terminals 17.

Figure 2:
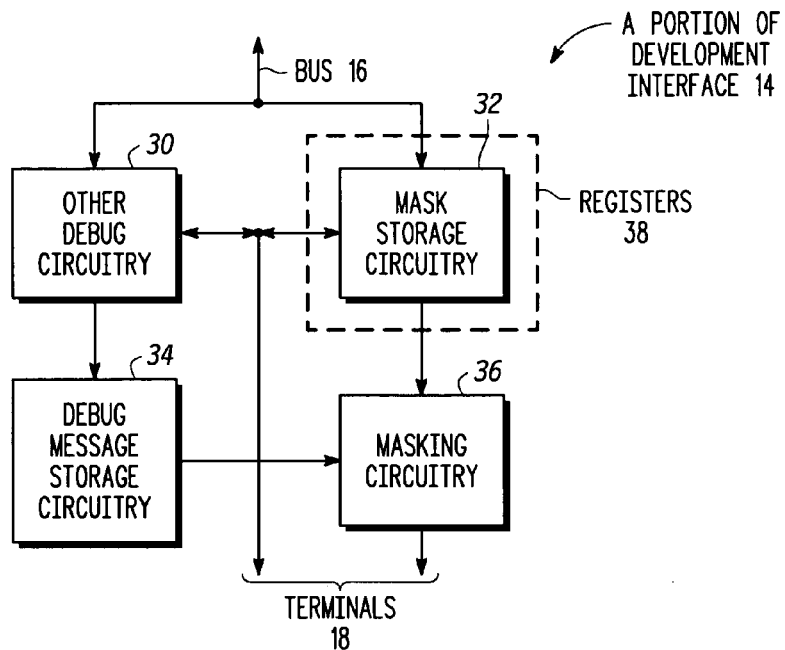
FIG. 2 illustrates, in block diagram form, a portion of a development interface of FIG. 1 in accordance with one embodiment of the present invention.

FIG. 2 illustrates, in block diagram form, a portion of development interface 14 of FIG. 1 in accordance with one embodiment of the present invention. In one embodiment, development interface includes mask storage circuitry 32 and other debug circuitry 30 which are bi-directionally coupled to each other, to bus 16, and to terminals 18. Masking circuitry 36 is coupled to mask storage circuitry 32 and to terminals 18. Debug message storage circuitry 34 is coupled to other debug circuitry 30 and to masking circuitry 36. In one embodiment, mask storage circuitry is included as part of registers 38. Alternate embodiments of the present invention may locate and coupled mask storage circuitry 32 anywhere in development interface 14, or alternately, anywhere in data processing system 10. Likewise, debug message storage circuitry 34 and masking circuitry 36 may be located anywhere and coupled in any manner in development interface 14 or data processing system 10.

Debug message storage circuitry 34 can also be referred to as data storage circuitry. Debug message storage circuitry 34 may store data to be transferred external to data processing system 10 by way of terminals 18, for example, when development interface 14 performs other or additional functions beyond development functions.

Figure 3:
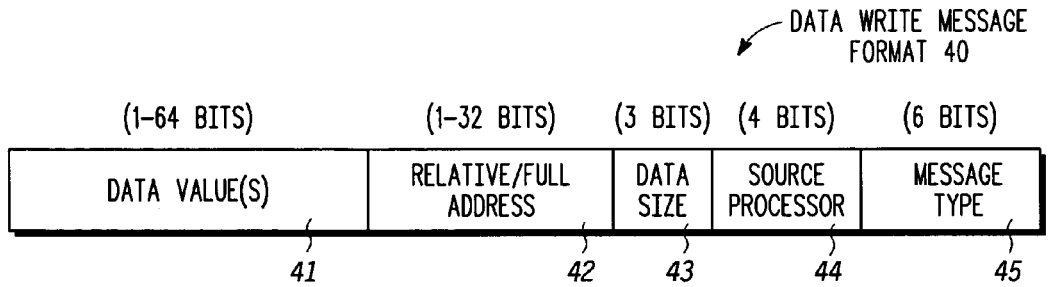
FIG. 3 illustrates, in block diagram form, a data write message format in accordance with one embodiment of the present invention.

FIG. 3 illustrates, in block diagram form, a data write message format 40 in accordance with one embodiment of the present invention. In one embodiment of the present invention, the data write message format 40 includes a plurality of bit fields, namely a data values(s) bit field 41, a relative/full address bit field 42, a data size bit field 43, a source processor bit field 44, and a message type bit field 45. Although the data write message format 40 has been illustrated as having the indicated number of bits for each bit field, alternate embodiments of the present invention may use any number of bits for each bit field.

For some embodiments of the present invention, address field 42 can represent either a full address or a relative address. Alternate embodiments of the present invention may use an address field in a different manner (e.g. full only, relative only, etc.). The data size field 43 may be used to indicate the width of data value(s) being transmitted in the data value(s) field 41. For one embodiment, the data value(s) may have a width of 8-bits, 16-bits, 32-bits, or 64-bits. Alternate embodiments may use any desired data sizes. The source processor field 44 may be used to indicate which processor in processing units 11 (see FIG. 1) corresponds to a particular data write message. Alternate embodiments of the present invention may instead use field 44 as a general source field where any source circuitry, not just a processing unit 11, may be the source circuitry to which a particular data write message corresponds. For example, source circuitry may be DMA (Direct Memory Access) circuitry, may be a bus master on any of bus(es) 16, or may be any other circuitry in data processing system 10.

The message type field 45 may be used to indicate what type of information is contained within the current message (e.g. whether the message is a data write or a data read message). The message type field 45 may also be used to provide special information, such as, for example, whether or not an error condition has occurred. In one embodiment of the present invention, the data write message format 40 is compatible with the NEXUS 5001™ (i.e. IEEE ISTO 5001) debug standard defined by the IEEE (Institute of Electrical and Electronic Engineers). For this embodiment of the present invention, the message type field 45 may be used to transmit TCODES.

Note that alternate embodiments of the present invention may use more, fewer, or different bit fields than those illustrated in FIG. 3.

Figure 4:
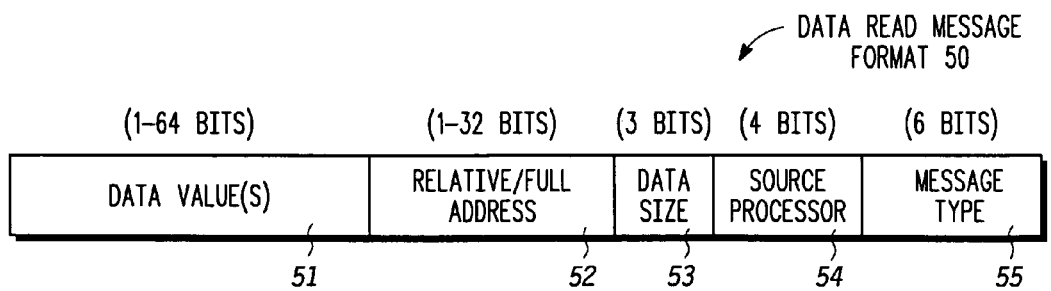
FIG. 4 illustrates, in block diagram form, a data read message format in accordance with one embodiment of the present invention.
Figure 5:
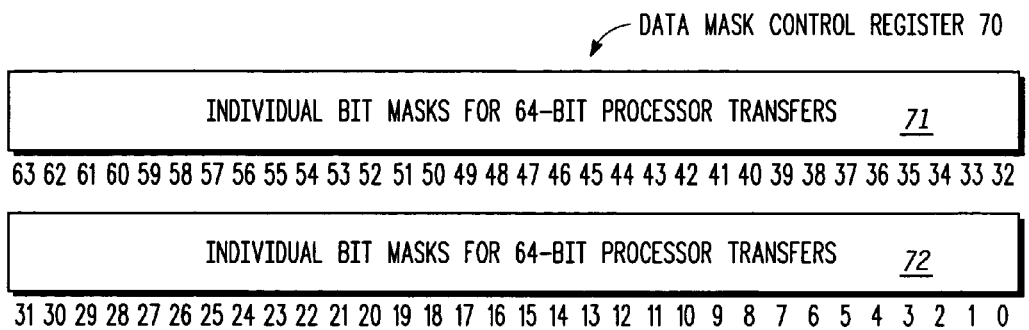
FIG. 5 illustrates, in block diagram form, a data mask control register 70 in accordance with one embodiment of the present invention.
Figure 6:
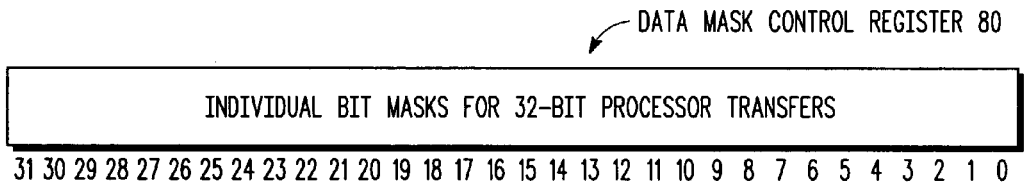
FIG. 6 illustrates, in block diagram form, a data mask control register 80 in accordance with one embodiment of the present invention.
Figure 7:
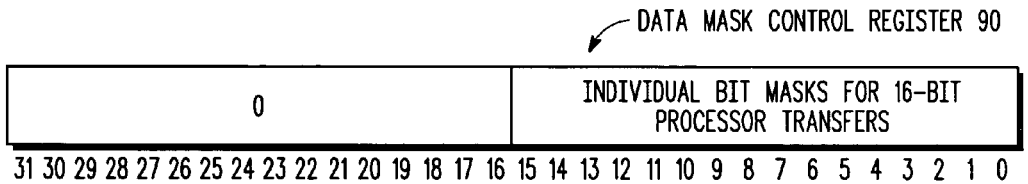
FIG. 7 illustrates, in block diagram form, a data mask control register 90 in accordance with one embodiment of the present invention.
Figure 8:
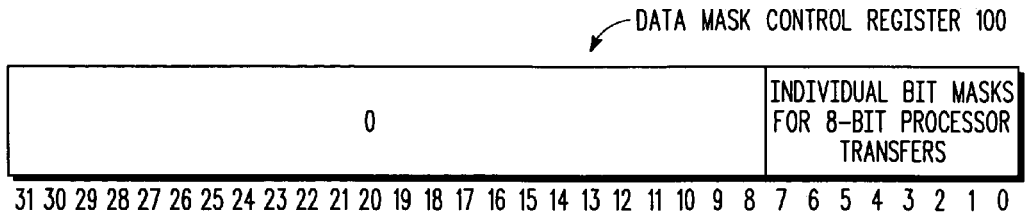
FIG. 8 illustrates, in block diagram form, a data mask control register 100 in accordance with one embodiment of the present invention.

FIG. 4 illustrates, in block diagram form, a data read message format 50 in accordance with one embodiment of the present invention. Note that the data read message format 50 of FIG. 4 is for read accesses to data processing system 10, whereas the data write message format 40 of FIG. 3 was for write accesses to data processing system 10. In one embodiment of the present invention, a bit in the message type field 45 and 55 are used to distinguish whether the data message type is "write" as in format 40 or "read" as in format 50. Alternate embodiments of the present invention may use only a single debug message format, may use more than two debug message formats, or may use different debug message formats than those illustrated in FIGS. 3 and 4. For one embodiment, the bit fields 51-55 of data read message format 50 function in the same manner as the corresponding bit fields 41-45 of data write message format 40 described above. In alternate embodiments, bits fields 51-55 may have different functions than those described above for format 40. Although the data read message format 50 has been illustrated as having the indicated number of bits for each bit field, alternate embodiments of the present invention may use any number of bits for each bit field. Note that alternate embodiments of the present invention may use more, fewer, or different bit fields than those illustrated in FIG. 4.

In one embodiment of the present invention, the data read message format 50 is compatible with the NEXUS 5001™ (i.e. IEEE ISTO 5001) debug standard defined by the IEEE (Institute of Electrical and Electronic Engineers). For this embodiment of the present invention, the message type field 45 may be used to transmit TCODES.

FIGS. 5-8 illustrate, in block diagram form, data mask control registers 70, 80, 90, and 100 in accordance with one embodiment of the present invention. In the illustrated embodiment, separate masks are use for different data widths. For example, data mask control register 70 has two 32-bit portions 71 and 72, each of which stores a 32-bit mask. The 32-bit masks in portions 71 and 72 are then concatenated to form a 64-bit mask. Data mask control register 80 stores a 32-bit mask, data mask control register 90 stores a 16-bit mask, and data mask control register 100 stores an 8-bit mask. Alternate embodiments of the present invention may use more, fewer, or different data mask control registers.

Also, in alternate embodiments, a plurality of the mask values can be located in the same register (e.g. the 8-bits required by the mask stored in data mask register 100 can be stored in the same 32-bit register as the 16-bits required by the mask stored in data mask register 90). Alternate embodiments may even have multiple masks for a given data width. For example, data mask register 100 may store four different 8-bit mask values which may be used to selectively mask different debug messages. For example, which 8-bit mask value is used may be determined by a field in the debug message itself. For example, referring to FIGS. 3 and 4, message type field 45 and 55 may be used to select which 8-bit mask value from the plurality of mask values in register 100 is actually used to perform the masking.

Referring to FIGS. 2-8, one of data mask registers 70, 80, 90, and 100 is used to provide a mask value from mask storage circuitry 32 (see FIG. 2) to masking circuitry 36. The mask selected may be based on the size of a processor data transfer, or may be selected based on other attributes of the access.

Masking circuitry 36 then uses this mask value to mask selected bits in the data value(s) bit field 41, 51. The masked bits in the data value(s) field 41, 51 are then not transmitted to terminals 18, and thus are not transmitted to the external development system 25. The masking process provided by masking circuitry 36 allows the effective bandwidth of terminals 18 to be significantly increased.

FIG. 9 illustrates, in block diagram form, an address mask control register 110 in accordance with one embodiment of the present invention. FIG. 10 illustrates, in block diagram form, an address mask control register 120 in accordance with one embodiment of the present invention. In one embodiment, separate masks (stored in register 110 and 120, respectively) are use for normal messages and for synchronizing messages. In an alternate embodiment, register 110 may be used to mask relative addresses and register 120 may be used to mask full addresses. Also, separate masks may be provided for read messages and for write messages. As an example of this, in an alternate embodiment, the mask stored in register 110 may be used to mask selected bits in bit field 42 in data write message format 40 (see FIG. 3), and the mask stored in register 120 may be used to mask selected bits in bit field 52 in data read message format 50 (see FIG. 4). Alternate embodiments of the present invention may use more, fewer, or different address mask control registers.

Also, in alternate embodiments, a plurality of the mask values can be located in the same register. Alternate embodiments may even have multiple masks for a given address type (e.g. relative addresses). For example, address mask register 110 may store a mask value which may be used to selectively mask addresses in a particular range of addresses, while address mask register 120 may store a mask value which may be used to selectively mask addresses in a different range of addresses. Alternately, message type field 45 and 55 (see FIGS. 3 and 4) may be used to select which address mask value from the plurality of address mask registers 110, 120 is actually used to perform the masking.

Referring to FIGS. 2-4 and 9-10, one of address mask registers 110, 120 is used to provide a mask value from mask storage circuitry 32 (see FIG. 2) to masking circuitry 36. Masking circuitry 36 then uses this mask value to mask selected bits in the address field 42, 52. The masked bits in the address field 42, 52 are then not transmitted to terminals 18, and thus are not transmitted to the external development system 25. The masking process provided by masking circuitry 36 allows the effective bandwidth of terminals 18 to be significantly increased.

FIG. 11 illustrates, in block diagram form, a source mask control register 130 in accordance with one embodiment of the present invention. In one embodiment, an individual source processor bit mask for data trace messages is stored in a portion of source mask control register 130. This source processor mask stored in register 130 may be used to mask selected bits in bit field 44 (see FIG. 3) and in bit field 54 (see FIG. 4). In alternate embodiments, separate masks may be provided for read messages and for write messages. As an example of this, in an alternate embodiment, a first mask stored in a first portion of register 130 may be used to mask selected bits in bit field 44 in data write message format 40 (see FIG. 3), and a second mask stored in a second portion of register 130 may be used to mask selected bits in bit field 54 in data read message format 50 (see FIG. 4). Alternately, message type field 45 and 55 (see FIGS. 3 and 4) may be used to select which source mask value from the plurality of source mask values is actually used to perform the masking. Alternate embodiments of the present invention may use more, fewer, or different size fields in source mask register 130.

Referring to FIGS. 2-4 and 11, a mask from source mask register 130 is used to provide a mask value from mask storage circuitry 32 (see FIG. 2) to masking circuitry 36. Masking circuitry 36 then uses this mask value to mask selected bits in the source processor field 44, 54. The masked bits in the source processor field 44, 54 are then not transmitted to terminals 18, and thus are not transmitted to the external development system 25. The masking process provided by masking circuitry 36 allows the effective bandwidth of terminals 18 to be significantly increased.

FIG. 12 illustrates, in block diagram form, a data size mask control register in accordance with one embodiment of the present invention. In one embodiment, an individual data size bit mask for data trace messages is stored in a portion of data size mask control register 140. This data size mask stored in register 140 may be used to mask selected bits in bit field 43 (see FIG. 3) and in bit field 53 (see FIG. 4). In alternate embodiments, separate masks may be provided for read messages and for write messages. Alternately, message type field 45 and 55 (see FIGS. 3 and 4) may be used to select which data size mask value from the plurality of data size mask values is actually used to perform the masking. Alternate embodiments of the present invention may use more, fewer, or different size fields in data size mask register 140.

Referring to FIGS. 2-4 and 12, a mask from data size mask register 140 is used to provide a mask value from mask storage circuitry 32 (see FIG. 2) to masking circuitry 36. Masking circuitry 36 then uses this mask value to mask selected bits in the data size field 43, 53. The masked bits in the data size field 43, 53 are then not transmitted to terminals 18, and thus are not transmitted to the external development system 25. The masking process provided by masking circuitry 36 allows the effective bandwidth of terminals 18 to be significantly increased.

FIG. 13 illustrates, in block diagram form, a message type mask control register in accordance with one embodiment of the present invention. In one embodiment, an individual message type bit mask for all messages is stored in a portion of message type mask control register 150. This message type mask stored in register 150 may be used to mask selected bits in bit field 45 (see FIG. 3) and in bit field 55 (see FIG. 4). In alternate embodiments, separate masks may be provided for read messages and for write messages. Alternate embodiments of the present invention may use more, fewer, or different size fields in message type mask register 150.

Referring to FIGS. 2-4 and 13, a mask from message type mask register 150 is used to provide a mask value from mask storage circuitry 32 (see FIG. 2) to masking circuitry 36. Masking circuitry 36 then uses this mask value to mask selected bits in the message type field 45, 55. The masked bits in the message type field 45, 55 are then not transmitted to terminals 18, and thus are not transmitted to the external development system 25. The masking process provided by masking circuitry 36 allows the effective bandwidth of terminals 18 to be significantly increased.

In one embodiment of the present invention, the message type mask stored in register 150 may be used to mask all messages, whereas the masks stored in selected other registers (e.g. registers 110-150) may only be used to mask selected message types (e.g. data trace messages). Note that what type of message is being sent is indicated by the message type fields 45 and 55 (see FIGS. 3 and 4). Alternate embodiments of the present invention may selectively apply one or more of the available masks based on message type, read/write, or any other criteria. In one embodiment of the present invention, the message type fields 45 and 55 are used to provide the TCODES used by the NEXUS 5001™ debug standard.

Note that any of the masks illustrated in FIGS. 5-13 may be co-located in the same register, provided that the register has sufficient bits available. In one embodiment of the present invention, mask registers 70, 80, 90, 100, 110, 120, 130, 140, and 150 may all be located as part of mask storage circuitry 32. In alternate embodiments of the present invention, mask registers 70, 80, 90, 100, 110, 120, 130, 140, and 150 may be located anywhere in data processing system 10. Although the illustrated embodiment of the present invention uses mask registers 70, 80, 90, 100, 110, 120, 130, 140, and 150 to mask bits in a debug message using the formats 40 and 50 illustrated in FIGS. 3 and 4, alternate embodiments may use similar or different mask registers to mask bits in any desired type of message using any desired message format.

EXAMPLE 200

FIG. 14 describes an example 200 of how masking may be used to reduce the number of output bits transmitted (i.e. bandwidth) on terminals 18. FIG. 14 illustrates an example 200 in which two control variables (Variable1 and Variable2) in memory are monitored while program flow is traced. Referring to box 201 in FIG. 14, Variable1 is located at address 0x1300D3C3 and has a variable type of 8-bits. Variable2 is located at address 0x81001BF4 and has a variable type of 16-bits. If a debug message using the data message format (40 for write, 50 for read) illustrated in FIGS. 3 and 4 is used for Variable1, then 52 bits are required to be sent from development interface 14 to external development system 25 (see box 202). Similarly, if a debug message using the data message format (40 for write, 50 for read) illustrated in FIGS. 3 and 4 is used for Variable2, then 60 bits are required to be sent from development interface 14 to external development system 25 (see box 202).

However, in this example 200, many of the bits in the debug message are not providing useful information to external development system 25 and are thus wasting important bandwidth on terminals 18. Referring to box 204, it is possible to significantly reduce the number of bits transmitted on terminals 18 without losing any important information. In box 204, all of the data bits contain useful information and thus are not masked at all. In box 204, only bit A31 is required in order to differential between the address location for Variable1 and the address location for Variable2. Thus A31 is the only address bit in address field 42 (see FIG. 3) which is required by external development system 25. Since the width of the data field is already known by external development system 25 from the variable type, no bits from the data size field 53 (see FIG. 3) are required by external development system 25. In example 200, there is only one source processor, and as a result, no bits from the source processor field 44 (see FIG. 3) are required by external development system 25. In example 200, the only useful information provided by the message type field 45 (see FIG. 3) is the individual bit which indicates whether or not an error has occurred. As a result, only one bit from the message type field 45 is required by external development system 25.

If the 52-bits of the Variable1 debug message are masked using the relevant registers illustrated in FIGS. 5-13 to remove unnecessary bits, the resulting masked message has significantly fewer bits: only 10-bits. Thus instead of having to transmit 52-bits across terminals 18, only 10-bits have to be transmitted. This is a significant savings in bandwidth which can be replicated for each trace or debug message that provides the necessary information regarding Variable1 for external development system 25. Similarly, if the 60-bits of the Variable2 message are masked using the relevant registers illustrated in FIGS. 5-13 to remove unnecessary bits, the resulting masked message has significantly fewer bits: only 18-bits. Thus instead of having to transmit 60-bits across terminals 18, only 18-bits have to be transmitted. This is a significant savings in bandwidth which can be replicated for each trace or debug message that provides the necessary information regarding Variable2 for external development system 25.

Box 206 illustrates the values which may be stored in mask register 150 (see FIG. 13), mask register 130 (see FIG. 11), mask register 140 (see FIG. 12), and mask register 120 (see FIG. 10) to provide the masking to remove the unneeded bits from the debug message for Variable1 (52-bits non-masked) and the debug message for Variable2 (60-bits non-masked). Note that data mask registers 70, 80, 90, and 100 are not used in this example 200 because all of the data is required by external development system 25, and thus no masking is performed on the data field 41 (see FIG. 3).

Note that for the embodiments of the present invention illustrated in examples 200, 300, and 400, a binary 1 in a mask register bit causes the corresponding bit of the debug message to be masked and not transmitted on terminals 18, and a binary 0 in a mask register bit causes the corresponding bit of the debug message to be non-masked and thus allowed to be transmitted on terminals 18. For example 200, message type mask control register 150 stores % 111110, source mask control register 130 stores % 1111, data size mask control register 140 stores %111, and address (full) mask control register 120 stores %1111111111111111111111111111110.

EXAMPLE 300

FIG. 15 describes an example 300 of how masking may be used to reduce the number of output bits transmitted (i.e. bandwidth) on terminals 18. FIG. 15 illustrates an example 300 in which an array of mixed single-precision and double-precision floating point control variables in memory are monitored while program flow is traced. External development system 25 is monitoring to determine when a control variable exceeds approximately 12.5% (i.e. ⅛) of the magnitude supported by the data type of the variable. Referring to box 301 in FIG. 15, Array1 is located at addresses 0x1300D300-0x1300D3FF and consists of 16 double-precision variables and 32 single-precision variables which can be randomly accessed. If a debug message using the data message format (40 for write, 50 for read) illustrated in FIGS. 3 and 4 is used for double-precision variables in Array1, then 85 bits are required to be sent from development interface 14 to external development system 25 (see box 302). Similarly, if a debug message using the data message format (40 for write, 50 for read) illustrated in FIGS. 3 and 4 is used for single-precision variables in Array1, then 53 bits are required to be sent from development interface 14 to external development system 25 (see box 302).

However, in this example 300, many of the bits in the debug message are not providing useful information to external development system 25 and are thus wasting important bandwidth on terminals 18. Referring to box 304, it is possible to significantly reduce the number of bits transmitted on terminals 18 without losing any important information. In box 304, only three bits of the data field 41 (see FIG. 3) contain useful information for determining an over-range situation (the upper three bits of the exponent), and thus are not masked. In box 304, 8-bits of the address field 42 (see FIG. 3) are required in order to identify which variable in Array1 corresponds to this debug message. One bit in data size field 43 (see FIG. 3) is required in order to determine whether the variable is single-precision or double-precision. In example 300, there is only one source processor, and as a result, no bits from the source processor field 44 (see FIG. 3) are required by external development system 25. In example 300, the only useful information provided by the message type field 45 (see FIG. 3) is the individual bit which indicates whether or not an error has occurred. As a result, only one bit from the message type field 45 is required by external development system 25.

If the 85-bits of the double-precision Array1 debug message are masked using the relevant registers illustrated in FIGS. 5-13 to remove unnecessary bits, the resulting masked message has significantly fewer bits: only 13-bits. Thus instead of having to transmit 85-bits across terminals 18, only 13-bits have to be transmitted. This is a significant savings in bandwidth which can be replicated for each trace or debug message that provides the necessary information regarding double-precision Array 1 variables for external development system 25. Similarly, if the 53-bits of the single-precision Array1 debug message are masked using the relevant registers illustrated in FIGS. 5-13 to remove unnecessary bits, the resulting masked message has significantly fewer bits: only 13-bits. Thus instead of having to transmit 53-bits across terminals 18, only 13-bits have to be transmitted. This is a significant savings in bandwidth which can be replicated for each trace or debug message that provides the necessary information regarding single-precision Array1 variables for external development system 25.

Box 306 illustrates the values which may be stored in mask register 150 (see FIG. 13), mask register 130 (see FIG. 11), mask register 140 (see FIG. 12), mask register 110 (see FIG. 9), mask register 70 (see FIG. 5), and mask register 80 (see FIG. 6) to provide the masking to remove the unneeded bits from the debug message for double-precision Array1 variables (85-bits non-masked) and the debug message for single-precision Array1 variables (53-bits non-masked).

Note that for the embodiments of the present invention illustrated in examples 200, 300, and 400, a binary 1 in a mask register bit causes the corresponding bit of the debug message to be masked and not transmitted on terminals 18, and a binary 0 in a mask register bit causes the corresponding bit of the debug message to be non-masked and thus allowed to be transmitted on terminals 18. For example 300, message type mask control register 150 stores %111110, source mask control register 110 stores %1111, data size mask control register 140 stores %110, address (relative) mask control register 110 stores %1111111111111111111111000000000, data mask control register 70 stores 11, and data mask control register 80 stores %10001111111111111111111111111111111.

EXAMPLE 400

FIG. 16 describes an example 400 of how masking may be used to reduce the number of output bits transmitted (i.e. bandwidth) on terminals 18. FIG. 16 illustrates an example 400 in which an array of mixed single-precision and double-precision floating point control variables in memory are monitored while program flow is traced. External development system 25 is monitoring approximate values of bounded control variables. Referring to box 401 in FIG. 16, Array1 is located at addresses 0x1300D300-0x1300D3FF and consists of 16 double-precision variables and 32 single-precision variables which can be randomly accessed. If a debug message using the data message format (40 for write, 50 for read) illustrated in FIGS. 3 and 4 is used for double-precision variables in Array1, then 85 bits are required to be sent from development interface 14 to external development system 25 (see box 402). Similarly, if a debug message using the data message format (40 for write, 50 for read) illustrated in FIGS. 3 and 4 is used for single-precision variables in Array1, then 53 bits are required to be sent from development interface 14 to external development system 25 (see box 402).

However, in this example 400, many of the bits in the debug message are not providing useful information to external development system 25 and are thus wasting important bandwidth on terminals 18. Referring to box 404, it is possible to significantly reduce the number of bits transmitted on terminals 18 without losing any important information. In box 404, only selected bits of the data field 41 (see FIG. 3) contain useful information (i.e. the sign bit, the lower 5-bits of the single-precision exponent, the middle 5-bits of the double-precision exponent, and a portion of the most significant bits of the mantissa) and thus are not masked. In box 404, 8 bits of the address field 42 (see FIG. 3) are required in order to identify which variable in Array1 corresponds to this debug message. One bit in data size field 43 (see FIG. 3) is required in order to determine whether the variable is single-precision or double-precision. In example 400, there is only one source processor, and as a result, no bits from the source processor field 44 (see FIG. 3) are required by external development system 25. In example 400, the only useful information provided by the message type field 45 (see FIG. 3) is the individual bit which indicates whether or not an error has occurred. As a result, only one bit from the message type field 45 is required by external development system 25.

If the 85-bits of the double-precision Array1 debug message are masked using the relevant registers illustrated in FIGS. 5-13 to remove unnecessary bits, the resulting masked message has significantly fewer bits: only 20 bits. Thus instead of having to transmit 85 bits across terminals 18, only 20 bits have to be transmitted. This is a significant savings in bandwidth which can be replicated for each trace or debug message that provides the necessary information regarding double-precision Array1 variables for external development system 25. Similarly, if the 53 bits of the single-precision Array1 debug message are masked using the relevant registers illustrated in FIGS. 5-13 to remove unnecessary bits, the resulting masked message has significantly fewer bits: only 20 bits. Thus instead of having to transmit 53 bits across terminals 18, only 20 bits have to be transmitted. This is a significant savings in bandwidth which can be replicated for each trace or debug message that provides the necessary information regarding single-precision Array1 variables for external development system 25.

Box 406 illustrates the values which may be stored in mask register 150 (see FIG. 13), mask register 130 (see FIG. 11), mask register 140 (see FIG. 12), mask register 110 (see FIG. 9), mask register 70 (see FIG. 5), and mask register 80 (see FIG. 6) to provide the masking to remove the unneeded bits from the debug message for double-precision Array1 variables (85-bits non-masked) and the debug message for single-precision Array1 variables (53-bits non-masked).

Note that for the embodiments of the present invention illustrated in examples 200, 300, and 400, a binary 1 in a mask register bit causes the corresponding bit of the debug message to be masked and not transmitted on terminals 18, and a binary 0 in a mask register bit causes the corresponding bit of the debug message to be non-masked and thus allowed to be transmitted on terminals 18. For example 400, message type mask control register 150 stores %111110, source mask control register 110 stores %1111, data size mask control register 140 stores %110, address (relative) mask control register 110 stores %11111111111111111111111000000000, data mask control register 70 stores 11, and data mask control register 80 stores %01110000000001111111111111111111.

Note that examples 200, 300, and 400 described in FIGS. 14-16 have been given for illustrative purposes only. The present invention may be used for any desired function. Development interfaces and debug functions are just one of the areas in which the present invention is applicable. Various embodiments of the present invention may be useful in any context in which a masking capability is desired.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method for masking debug messages comprising:
   generating a debug message, wherein the debug message comprises a plurality of fields; and
   applying at least one user configurable mask to the debug message to generate a masked debug message, wherein applying the at least one user configurable mask to the debug message to generate the masked debug message comprises:
   (1) applying the at least one user configurable mask to mask at least one of the plurality of fields, wherein the plurality of fields comprises a data field, an address field, a data size field, a source field, and a message type field; and
   (2) applying the at least one user configurable mask to mask a portion of at least one field of the plurality of fields, wherein the portion of the at least one field is less than all of the at least one field.

2. The method of claim 1, further comprising:
   selecting the at least one user configurable mask from a plurality of user configurable masks, each of the plurality of user configurable masks corresponding to a field of the plurality of fields within the debug message.

3. The method of claim 2, wherein applying the at least one user configurable mask to the debug message to generate a masked debug message comprises:
   applying the at least one user configurable mask to mask a portion of at least one field of the plurality of fields, wherein the portion of the at least one field is less than all of the at least one field.

4. The method of claim 3, wherein the plurality of fields comprises a data field, an address field, a data size field, a source field, and a message type field.

5. The method of claim 1, wherein the debug message comprises a data field, wherein the at least one user configurable mask is selected from a plurality of user configurable masks corresponding to the data field, wherein the at least one user configurable mask is selected based on a data type of the data field.

6. The method of claim 5, wherein the data type indicates a size of the data within the data field.

7. A method for masking debug messages comprising:
   generating a debug message comprising debug information, wherein the debug message comprises a plurality of fields, including, an address field, wherein the at least one user configurable mask is selected from a plurality of user configurable masks corresponding to the address field, wherein the at least one user configurable mask is selected based on whether a full address or relative address is transferred; and
   applying at least one user configurable mask to the debug message to generate a masked debug message, wherein applying the at least one user configurable mask to the debug message to generate the masked debug message comprises applying the at least one user configurable mask to mask at least one of the plurality of fields.

8. An apparatus, comprising:
   debug circuitry, which performs a debug function and which generates a debug message corresponding to the debug function, wherein the debug message comprises a plurality of fields;
   mask storage circuitry which stores user configurable masking information; and
   masking circuitry, coupled to the mask storage circuitry, which applies the user configurable masking information to the debug message to generate a masked debug message, wherein the masking circuitry applies the masking information to mask a portion of at least one field of the plurality of fields, wherein the portion of the at least one field is less than all of the at least one field, and wherein the plurality of fields comprises a data field, an address field, a data size field, a source field, and a message type field.

9. The apparatus of claim 8, further comprising source circuitry coupled to the debug circuitry, wherein the debug circuitry performs the debug function on at least a portion of the source circuitry.

10. The apparatus of claim 9, wherein the source circuitry comprises a processor.

11. The apparatus of claim 8, wherein the masking circuitry selects at least one of the user configurable masks to apply to the debug message to generate the masked debug message.

12. The apparatus of claim 8, wherein each of the user configurable masks is stored in a user configurable register within the mask storage circuitry.

13. The apparatus of claim 8, wherein each of the user configurable masks corresponds to at least one of the plurality of fields.

14. The apparatus of claim 13, wherein the masking circuitry selects at least one of the user configurable masks to apply to the at least one field of the plurality of fields of the debug message to generate the masked debug message.

15. The apparatus of claim 13, wherein at least two of the user configurable masks corresponds to the data field, and wherein the masking circuitry selects one of the at least two of the user configurable masks based on a data type of data within the data field.

16. The apparatus of claim 8, wherein the masking circuitry provides the masked debug message via a debug terminal.

17. The apparatus of claim 8, further comprising debug message storage circuitry, coupled to the debug circuitry and the masking circuitry, which stores the generated debug message.

18. The apparatus of claim 8, further comprising debug message storage circuitry, coupled to the masking circuitry, which stores the generated masked debug message.

19. The apparatus of claim 18, wherein the debug message storage circuitry provides the masked debug message via a debug terminal.

20. An apparatus, comprising:
debug means for generating a debug message, wherein the debug message comprises a plurality of fields; and
masking means for applying at least one user configurable mask to the debug message to generate a masked debug message, wherein the masking means applies the at least one user configurable mask to mask a portion of at least one field of the plurality of fields, wherein the portion of the at least one field is less than all of the at least one field, and wherein the plurality of fields comprises a data field, and address field, a data size field, a source field, and a message type field.

21. The apparatus of claim 20, further comprising:
selecting means for selecting the at least one user configurable mask from the set of user configurable masks, each of the set of user configurable masks corresponding to a field of the plurality of fields within the debug message.

\* \* \* \* \*